(12) United States Patent
Kass

(10) Patent No.: US 9,813,429 B2
(45) Date of Patent: Nov. 7, 2017

(54) METHOD FOR SECURE WEB BROWSING

(71) Applicant: International Business Machines Corporation, Armonk, NY (US)

(72) Inventor: Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/713,483

(22) Filed: Dec. 13, 2012

(65) Prior Publication Data

US 2013/0174267 A1    Jul. 4, 2013

(51) Int. Cl.
 *H04L 29/06*     (2006.01)

(52) U.S. Cl.
 CPC .......... *H04L 63/14* (2013.01); *H04L 63/1441* (2013.01)

(58) Field of Classification Search
 None
 See application file for complete search history.

(56) References Cited

U.S. PATENT DOCUMENTS

| | | | | |
|---|---|---|---|---|
| 5,974,549 | A * | 10/1999 | Golan | 726/23 |
| 7,107,536 | B1 * | 9/2006 | Dowling | 715/738 |
| 7,694,328 | B2 | 4/2010 | Joshi et al. | |
| 7,832,012 | B2 | 11/2010 | Huddleston | |
| 2005/0091536 | A1 * | 4/2005 | Whitmer et al. | 713/201 |
| 2007/0136579 | A1 * | 6/2007 | Levy et al. | 713/168 |
| 2007/0174915 | A1 * | 7/2007 | Gribble et al. | 726/24 |
| 2008/0263650 | A1 * | 10/2008 | Kerschbaum | 726/9 |
| 2009/0282474 | A1 | 11/2009 | Chen et al. | |
| 2010/0192224 | A1 * | 7/2010 | Ferri et al. | 726/23 |
| 2011/0154431 | A1 | 6/2011 | Walsh | |
| 2011/0314546 | A1 | 12/2011 | Aziz et al. | |

FOREIGN PATENT DOCUMENTS

GB       2365561 A       2/2002

OTHER PUBLICATIONS

Microsoft Computer Dictionary, 5$^{th}$ ed., Microsoft Press, 2002, 3 pages (including cover, iv. 563).*
White, Ron., "How Computers Work", 7$^{th}$ ed., Que Publishing, 2004, 16 pages (including, cover, title, 47, 56, 60,61,100,101,114-116,185-187,298).*

* cited by examiner

*Primary Examiner* — Jeffrey Williams
(74) *Attorney, Agent, or Firm* — Roy W. Truelson

(57) ABSTRACT

The invention relates to a computer-implemented method for secure web browsing. The method includes:
 receiving a request submitted from a browser, the browser running in a default runtime environment;
 evaluating by the proxy module, the received request and/or evaluating the requested content;
 in case the request is determined to request insecure content and/or in case the requested content is determined to comprise insecure content, sending, by the proxy module, a copy of the received request to a receiver module running in a secure runtime environment;
 in case the request is determined to request secure content, sending a copy of the request to the remote server.

15 Claims, 3 Drawing Sheets

METHOD FOR SECURE WEB BROWSING

FIELD OF THE INVENTION

The invention relates to the field of data processing, and more particularly to the field of secure web browsing.

BACKGROUND

The Internet is a web woven of documents written in a hypertext markup language called HTML. Individual web pages are linked to each other via special pointers, so-called "hyperlinks". The HTML encoding behind such a link is an URL (uniform resource locator) pointing to another HTML document or to another resource providing content such as a picture, a video file, an executable file, a text file or any other kind of digital content. However, browsing the Internet with a browser (e.g. Firefox, Internet Explorer, Opera and the like) may threaten the security of a user's computer system. A URL may point to executable content containing viruses or Trojan horses. Links contained in e-mails mimicking an authentic link of a trusted provider may actually point to Internet sites comprising executable code for phishing passwords and other kinds of sensitive data.

A commonly used approach to secure web browsing is to modify the browser settings as to disable various scripting languages such as flash, active X, JavaScript and the like. However, said solutions often severely limit the kind of content which can be displayed in a web browser. In particular web pages comprising dynamic multimedia content may not be displayed properly or may not be displayed at all in such a browser. Another solution known in the art is to browse the Internet only after having logged in a computer system with a user account having very limited permissions, in particular with a user account not having the permission to install or deinstall any programs. However, this procedure is considered as highly inconvenient as the user may have to switch between different users very often. Still another solution is to use one computer for surfing the Internet and another one for executing EDV programs and administrative tasks. However, more and more application programs and business workflows require a permanent connection to the Internet and using a computer not being connected to the Internet may therefore not be an option.

SUMMARY OF THE INVENTION

It is an object of the invention to provide for an improved method, computer system and computer readable storage medium for allowing secure Internet browsing. The object is solved by the features of the independent claims. Preferred embodiments are given in the dependent claims. If not explicitly stated otherwise, embodiments of the invention can be freely combined with each other.

The terms 'content' or 'data content' relate to any kind of data requested from and provided by a remote server via a network.

'A protocol stack' as used herein is an implementation of a set of computer networking protocols. The protocols may be organized in one or more interoperable protocol layers, e.g. the network protocol layers of the OSI reference model or the set of TCP/IP protocols that define communication over the internet. Depending on the embodiment, the protocol stack is a socket API, a socket layer provider module or a network driver.

A 'proxy module' as used herein is any hardware, software and/or firmware module intermediating between a browser and a remote web server and controlling data traffic between the browser and the remote web server.

A 'browser' as used herein refers to any application program being adapted for retrieving and processing data from a remote server via a network, in particular the Internet. A browser may be a standard web browser such as Mozilla Firefox or Internet Explorer, or a customized application program.

'Insecure content' as used herein refers to any data having been determined to comprise at least one data pattern or having been determined to fulfill at least one criterion, said data pattern or fulfilled criterion being considered as an indicator of an—actual or potential—security risk for the computer system rendering or executing said content. Correspondingly, 'secure content' refers to any data determined not to comprise said pattern or not fulfilling any of said criteria.

A 'computer readable medium' may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A 'runtime environment' is any data processing realm providing hardware resources (processing power, memory, storage etc.) and/or software resources for executing code. A hardware based runtime environment may be a computer or cluster of computers. A software based runtime environment may be a virtual machine, etc. A 'secure runtime environment' is separated by safety measurements (e.g. firewalls, restricted I/O permissions etc) from any default runtime environment in a way ensuring that any code executed within the secure runtime environment does not affect any application program executed in said default runtime environment.

Aspects of embodiments of the invention relate to a proxy module and a receiver module. Both aspects will be described in greater detail in the following.

Proxy Module

In one aspect, the invention relates to a computer-implemented method for secure web browsing. The method comprises:

receiving, by a proxy module, a request submitted from a browser, the browser running in a default runtime environment, the request requesting content of a resource, the resource being provided by a remote server;

evaluating, by the proxy module, the received request for determining if the request is requesting insecure content and/or evaluating the requested content for determining if the requested content comprises insecure content;

in case the request is determined to request insecure content and/or in case the requested content is determined to comprise insecure content, sending, by the proxy module, a copy of the received request to a receiver module, the receiver module running in a secure runtime environment, the secure runtime environment preventing any malicious code executed in said runtime environment to affect the default runtime environment of the browser;

in case the request is determined to request secure content, sending, by the proxy module, a copy of the request to the remote server.

A resource may be a web service, a content management system, a static HTML page, or any other service or data repository providing requested content via a network.

Said features may be advantageous as they may allow to securely browse the Internet without having to switch the user account or the computer system or to limit the capabilities of the browser.

According to embodiments the receiver module, upon having received the request from the proxy module, sends a copy of the request to a secure browser, the secure browser being a browser running in the secure environment. Said feature allows submitting the copy of the request by the secure browser to the remote server providing the requested content, to receive the requested content by the secure browser and to render the potentially insecure data content by the secure browser within the secure runtime environment. Thus, the task of requesting, receiving and rendering data content considered as insecure is delegated transparently from the browser running in the default runtime environment, herein also referred to as 'default browser', to the secure browser running in the secure runtime environment.

The requested content is received from the remote server by the proxy module in response to the sending of the copy of the request. The received requested content.

In case the requested content is determined not to comprise insecure content, the proxy module forwards the requested and evaluated content to the browser. Said feature may be advantageous as content which is determined to be secure is automatically forwarded to the default browser of the user, not to the secure browser running in the secure environment. Thus, said features may provide for transparent browsing of secure content.

According to embodiments, in case the request is determined to request insecure content, the proxy module sends a copy of the request to the receiver module. Said features may be advantageous, because in case it can be determined by analyzing the request that the requested content (which may not have been received yet) could contain insecure content, by sending a copy of the request to the receiver module it can be avoided from the beginning that potentially harmful response content data is received by the browser of the default runtime environment. By sending a copy of such a potentially insecure request to the receiver module, the receiver module is enabled to submit said copy (directly or indirectly via a secure browser) to the remote server and to receive the requested content in a secure runtime environment.

The proxy module may then receive rendered content and/or a description thereof and/or an indication of the rendering in the secure runtime environment from the receiver module.

According to embodiments the proxy module is running on a proxy processing device, e.g. a router or a proxy computer. The browser is running on a user computer. Said features may be advantageous as the default runtime environment on the user device is physically separated from the proxy module and various safety measures provided by operating systems of the user computer may be applied for protecting the user computer from code executed on the proxy module running on the proxy processing device. Typically, one or more user computers are connected to the same proxy processing device and use said proxy processing device for secure web browsing. According to other embodiments, the proxy module and the browser are both running on the user computer. Said feature may be advantageous as it is not necessary to purchase additional hardware for operating the proxy module. In particular for allowing secure Internet browsing for private individuals or very small organizational units, running the browser in the default runtime environment and the proxy module on the same machine may be the cheapest and technically easiest implementation variant.

Some standard browsers allow users to specify a proxy module which shall be used for internet browsing. According to embodiments said specification facilities coming with Mozilla Firefox, Internet Explorer and other standard browser variants are used for specifying the proxy module to receive the requests submitted by the user via the browser running in the default runtime environment. The advantage of using a proxy in this way is that the invention can thus be implemented on a user's computer by simple configuration changes of standard browsers. No source code modification of existing applications or operating systems is necessary.

Depending on the embodiment of the invention, different communication protocols can be used. According to one embodiment, HTTP requests and corresponding HTTP responses are used. According to other embodiments, HTTPS request and corresponding HTTPS responses are used. Any other protocol used for requesting and receiving data via potentially insecure networks such as the Internet can be applied.

According to embodiments the secure runtime environment is a runtime environment provided by a secure computer. A secure computer may be, for example, a server belonging to a cluster of computers separated from the computer hosting the default runtime environment via a firewall. It may likewise be any other computer separated by a safety measure from the default runtime environment in a way preventing the spreading of malicious code executed in the secure runtime environment to the default runtime environment.

According to other embodiments the secure runtime environment is a virtual machine running on the proxy processing device. The browser of the user is running on the user computer. The virtual machine prevents any malicious code executed in said virtual machine to affect a runtime environment hosting the proxy module or the browser of the user.

According to further embodiments the secure runtime environment is a virtual machine running on the user computer. The browser of the user is also running on the user computer. The proxy module may run on the user computer in the default runtime environment or on a separate proxy processing device. Any malicious code executed in said virtual machine is prohibited from affecting the default runtime environment of the browser. This may be accomplished by processor and storage isolation provided by a virtual machine hypervisor such as, for example, VMware ESX, Collax V-Cube and Hyper-V.

According to further embodiments the secure runtime environment is a browser running on the user's computer with fewer privileges than the default runtime environment. In this case, said browser both acts as the secure runtime environment and as the secure browser.

According to embodiments the proxy module is implemented as an integral part of a protocol stack of the user computer, the protocol stack being responsible for establishing a network connection between the proxy module and the browser of the user computer and/or for establishing a network connection between the proxy module and the remote server. Said features may be advantageous as all requests from the user's computer are guaranteed to be trapped and forwarded as a copy to the receiver module in the secure runtime environment if necessary.

According to embodiments evaluating the received request comprises one or more steps to be executed by the proxy being selected, in any combination, from a group comprising: extracting a URL from the request and evaluating the URL; and evaluating the type of resource providing the requested content. The extraction and evaluation of the URL may comprise, for example, evaluating the domain, sub-domain, the parameters or parameter values or any other part of the URL for determining if the URL points at a potentially insecure resource. The evaluation of the type of the resource may comprise, for example, determining if the URL comprises a predefined data pattern, e.g. file extensions of a potentially dangerous type (e.g. .exe, .asp, .swf, .php or the like).

According to embodiments the computer-implemented method further comprises the following steps to be executed by the proxy module:

receiving at least a header of the response from the remote server, the response being a response to the request forwarded to the remote server;

evaluating the header for determining if the response comprises insecure content;

in case the response is determined to comprise insecure content, sending a copy of the request received by the proxy module to the receiver module for enabling the receiver module to send the request to the remote server;

in case the response is determined to comprise secure content, continuing receiving the complete response; and forwarding the complete response or the data contained therein to the browser having originally submitted the request.

Said features may be advantageous as the receiving of potentially malicious code by the proxy is automatically stopped upon determining that the received content may bear some security risks. Thus, unnecessary data traffic is avoided: the requested content needs to be requested a second time by the receiver module running in the secure runtime environment anyways.

The evaluation of the header may comprise a determination of a mime-type, an evaluation of a content-disposition response-header field, etc. The policies for determining which kind of header-elements should be considered as insecure may depend on the individual requirements of a particular user or company, and a variety of criteria and rules for deciding if a particular header content should be considered as insecure is possible.

The expression 'sending a copy of a received request' to the remote server as used herein shall indicate that the proxy module may parse, evaluate and process the request received from the default browser of the user. The proxy module may then create a new request (the copy of the received request). The new request may have a slightly different syntax than the received request and may have identical or at least similar semantic data content. The differences in syntax and/or semantics may depend on the protocol used for data communication between browser and proxy module on the one hand and proxy module and remote server on the other hand. A copy of a request as used herein comprises the specification of the originally requested resource, e.g. the URL of the resource providing the requested content, the parameters of a GET request etc. and/or any other parameter value contained in the originally received request being necessary for specifying and receiving the requested content from the remote server. Said minor variations regarding the syntax and/or semantics of the request received by the proxy module and the copy of the request sent to the receiver module are considered in the following as implementation details depending on the particularities of the protocols, networks and proxy modules used.

According to embodiments the step of continuing receiving the response comprises: receiving at least a part of a body of the response from the remote server; and evaluating the received part of the body for determining if the response comprises insecure content. Said evaluation may comprise, for example, an evaluation of a magic-number computed from the received part of the response. A magic-number as used herein is any constant numerical or text value used to identify a file format of a file comprising the response data or used to identify a protocol being used for transmitting the response.

According to embodiments the method further comprises: providing a set of rules for evaluating the request and/or the response; and providing a user interface for creating and/or modifying the rules. Using rules may be advantageous as they can be created and modified comparatively easy compared to, for example, using neural networks or other machine learning techniques. For example, a rule may specify that in case a request for a pdf document was received, said request is to be considered as a request for insecure content and is to be forwarded as a copy of the request received by the proxy module to the receiver module.

According to embodiments, the proxy module is in control of opening and closing the network connection from the proxy module to the remote server. The connection to the remote server is opened immediately at the time the browser requests the resource of the remote server. The connection is closed whenever the proxy module determines it no longer require further data content from the resource. The proxy module can't be infected by malicious code because it never executes but only evaluates data from the remote server.

In a further aspect the invention relates to a proxy processing device for secure web browsing. The proxy processing device comprises:

an interface being adapted for receiving a request submitted from a browser, the browser running in a default runtime environment, the request requesting content provided by a remote server;

a processor;

a computer-readable storage medium comprising instructions for operating a proxy module, the proxy module being adapted for:

evaluating the received request for determining if the request is requesting insecure content and/or evaluating the requested content for determining if the requested content comprises insecure content;

in case the request is determined to request insecure content and/or in case the requested content is determined to comprise insecure content, sending a copy of the received request to a receiver module, the receiver module running in a secure runtime environment, the secure runtime environment preventing any malicious code executed in said runtime environment to affect the default runtime environment of the browser;

in case the request is determined to request secure content,
forwarding a copy of the received request to the remote server.

According to some embodiments, the address of the proxy module used for secure web browsing needs to be manually configured within a web browser. According to other embodiments the used proxy module is transparent to the user computer and its browser as the used proxy module is contained in some routers used for web browsing.

Receiver Module

In a further aspect, the invention relates to a computer-implemented method for secure web browsing, the method being executed in a secure runtime environment. The method comprising:
receiving, by a receiver module running in the secure environment, a request from a proxy module, the proxy module running outside the secure runtime environment, the request requesting content provided by a remote server;
sending a copy of the received request to the remote server;
receiving a response in response to the sending of the copy of the request; rendering content of the received response within the secure runtime environment;
returning, by the receiver module, the rendered content and/or a description thereof and/or an indication of the rendering in the secure runtime environment to the proxy module.

The indication of the rendering in the secure runtime environment may comprise an indication of the secure runtime environment, e.g. an indication of the room or building where a secure computer hosting the secure runtime environment is located. The displaying device displaying the content rendered in the secure runtime environment may also be indicated. Such an indication may be, for example: <html><body>Your content is opened in the secure browser displayed in screen S2 of Computer 'Comp0123'</body></html>. Said features may be advantageous as even malicious data content may be executed by the receiver module or the secure browser and displayed via a screen of the machine hosting the secure runtime environment.

'Rendering' as used herein is the process of interpreting the received data content of the requested resource in a way that a graphical representation of said data content can be displayed via a graphical user interface to a user. The rendering may comprise creating an image file and/or a standard-conform HTML page for display by a standard browser and/or the generation of customized data objects interpretable by custom application programs for display via the graphical user interface.

According to embodiments, the proxy module forwards said rendered content, description and/or indication to the browser running in the default runtime environment. Said browser may display the rendered content, indication and/or description to a user.

Returning the rendered content and/or a description thereof may be advantageous in that the default runtime environment is never required to render—and thereby execute—potentially insecure data content. The default runtime environment merely needs to display content having been rendered already within a secure environment. For several use case scenarios, an indication that the content was rendered in the secure environment instead of displaying the rendered content is advantageous. For example in case the requested content indeed contained a virus or Trojan horse, the secure environment may stop rendering the insecure code and merely send a message to the browser in the default runtime environment that the requested content comprises malware and can therefore not be rendered. In other cases a requested content, e.g. the content of a web page, may be rendered into a stream of text or image data which cannot/is guaranteed not to comprise malicious code, said text or image data then being transferred by the receiver module via the proxy module to the browser in the default runtime environment for display.

Depending on the embodiment, different ways for rendering the content of the response exist. The content can be opened and displayed in a secure browser, i.e., a browser running in the secure runtime environment of the receiver module. Said browser may be a standard browser such as Firefox, Chrome or Internet Explorer or may be a custom application program developed for rendering and viewing the response data. The response data may be temporarily stored on a storage medium before it is opened and rendered automatically by the secure browser. The receiver module may be operable to start and terminate said secure browser, to send content received from the remote server to the secure browser for rendering said content. The receiver module may also be operable to receive the rendered data from the secure browser. The receiver module may add a description and an indication of the secure rendering to the rendered data received from the secure browser. The rendered content may be returned to the proxy module in combination with an indication that said content was rendered in the secure runtime environment. The rendered content, and, if present, also an indication of the secure rendering is forwarded by the proxy module to the browser from which the original request was submitted to the proxy module. Said browser may display the rendered response data and said indication to the user via a graphical user interface.

According to embodiments the receiver module is implemented as a listener which listens to a particular address used by the proxy module to forward copies of requests for insecure content.

According to embodiments the step of sending the copy of the received request to the remote server further comprises: extracting, by the receiver module, an URL from the received request. The URL points to a resource of the remote server, the resource providing the requested content. The receiver module starts or uses a secure browser for sending the copy of the received request to the remote server, e.g. by using the extracted URL as starting parameter when starting the browser or opening a new browser tab. The secure browser is a standard browser or a custom browser running in the secure runtime environment. The copy of the received request is submitted by the secure browser to the extracted URL. The secure browser may then receive a response from the requested remote server.

Preferentially, said copy of the request may be a http or https request.

According to other embodiments, the receiver module sends the copy of the request to the remote server and receives the response.

According to embodiments the steps of rendering the content of the received response within the secure runtime environment and the step of returning the rendered content and/or the description thereof and/or the indication of the rendering to the proxy module are executed according to an implementation variant being selected from one of three implementation variants comprising:

According to a first implementation variant, the content of the received response is rendered by the secure browser in response to the sending of the copy of the received request by the secure browser; the received content may be rendered by the secure browser and forwarded by the secure browser to the receiver module. At least the indication of the rendering is sent from the receiver module to the proxy module, the indication comprising a specification of a secure computer system hosting the secure runtime environment and/or a specification of one out of a plurality of screens of said secure computer system, said one screen displaying the rendered content. For example, the secure browser may render the response and display it via a screen S2. The receiver module may create a html document "<html><body>Your content is opened in the browser displayed in screen S2 of computer 'Comp0123'</body></html>" and send said html document to the proxy module for forwarding it to the browser of the user.

According to a second implementation variant, the receiver module extracts an URL from the received request. The URL points to a resource of the remote server, the resource providing the requested content. The URL may be, for example, a link to a flash object hosted by the remote server. The receiver module creates an html page comprising the URL as a value of a src attribute and stores the html page in a storage medium within the secure runtime environment. The receiver module then triggers the secure browser to open, render and display the stored html page including the source provided via the URL. Then, the receiver module sends at least the indication of the rendering to the proxy module, the indication comprising a specification of the secure computer system and/or a specification of the one screen displaying the rendered content. For example, the receiver module may extract a URL "http://www.insecureserver.com/guide/widget/widget1" pointing to a Flash application. The receiver module may create the following html document RENDERME.html: "<html><body><embed src=" http://www.insecureserver.com/guide/widget/widget1" quality="high" wmode="opaque" type="application/x-shockwave-flash" pluginspage="http://www.macromedia.com/go/getflashplayer"></embed></body></html>. The receiver module stores the file RENDERME.html to a storage medium of the secure runtime environment and triggers the secure browser to open the RENDERME.html file for rendering and displaying the content of said page via the secure browser. Preferentially, an indication of the rendering comprising an indication of the display device displaying the rendered content is sent by the receiver module to the proxy module.

According to a third implementation variant, the receiver module renders the received content and stores the rendered content in a storage medium within the secure runtime environment in a secure data format. The secure data format is a data format being guaranteed not to comprise executable instructions. Preferentially, said data format may be an image file, e.g. a jpg file or the like. The rendering may also comprise evaluating the received content and determining a bar code or other predefined identifier or predefined content to be forwarded instead of the content received originally from the remote server. At least the description of the rendered content is sent from the receiver module to the proxy module. The description comprises a content-address, the content-address allowing a browser outside the secure runtime environment to access and open said stored and rendered content. Preferentially, the description is a html document comprising a link with a src attribute pointing to an image, said image comprising the rendered content. For example, the receiver module may have stored the rendered data content in a file "RENDERED-CONTENT.jpg, the format of said file being a secure format. The receiver module then creates a html page comprising "<html><body><img rsc="http://receiver_ip_address/RENDERED-CONTENT.jpg"></body></html>", wherein the receiver_ip_address is the IP address of the server hosting the secure runtime environment. Said created html page may be sent to the proxy module to let the browser of the user display the html page. Said features may be advantageous as this rendered image is guaranteed to comprise no executable malware and can therefore be displayed in the browser of the default runtime environment without any security risk. Depending on the embodiment, the implementation variants may be used solely or in any combination with each other.

According to embodiments the receiver module is a web server, the web server being adapted for sending the rendered content and/or a description thereof and/or an indication of the rendering in the secure runtime environment to the proxy module. This may be performed by sending a html document to the proxy module, the sent html document comprising a content-address to rendered content stored to a transitory or non-transitory storage medium within the secure runtime environment or comprising an indication of a display device coupled to the secure runtime environment where the rendered content is displayed.

Implementing the receiver module as web server may be advantageous as many standard proxies already come with code allowing the retrieval and interpretation of data provided by web servers and application servers.

In a further aspect the invention relates to a secure computer system comprising:

a processor;

a first interface being adapted for receiving a request submitted from a proxy module, the request requesting content provided by a remote server;

a secure runtime environment;

a computer-readable storage medium comprising instructions for operating a receiver module, the receiver module running in the secure runtime environment;

a second interface being adapted for:

sending a copy of the received request to the remote server;

receiving a response in response to the sending of the copy of the received request;

a secure browser, the secure browser and/or the receiver module being adapted for rendering the content of the received response within the secure runtime environment;

wherein the receiver module is further adapted for returning the rendered content to the proxy module.

According to embodiment, the receiver module is connected to the proxy module and the internet only. The browser running on the user computer may be connected to the internet and/or an intranet for requesting and receiving the content from the remote server.

In a further aspect the invention relates to a computer-readable storage medium comprising computer-interpretable instructions which when executed by a processor cause the processor to execute a method according to anyone of the above embodiments of a method executed on the proxy side and/or of anyone of the above embodiments executed on the side of the receiver module.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

Figure 1:
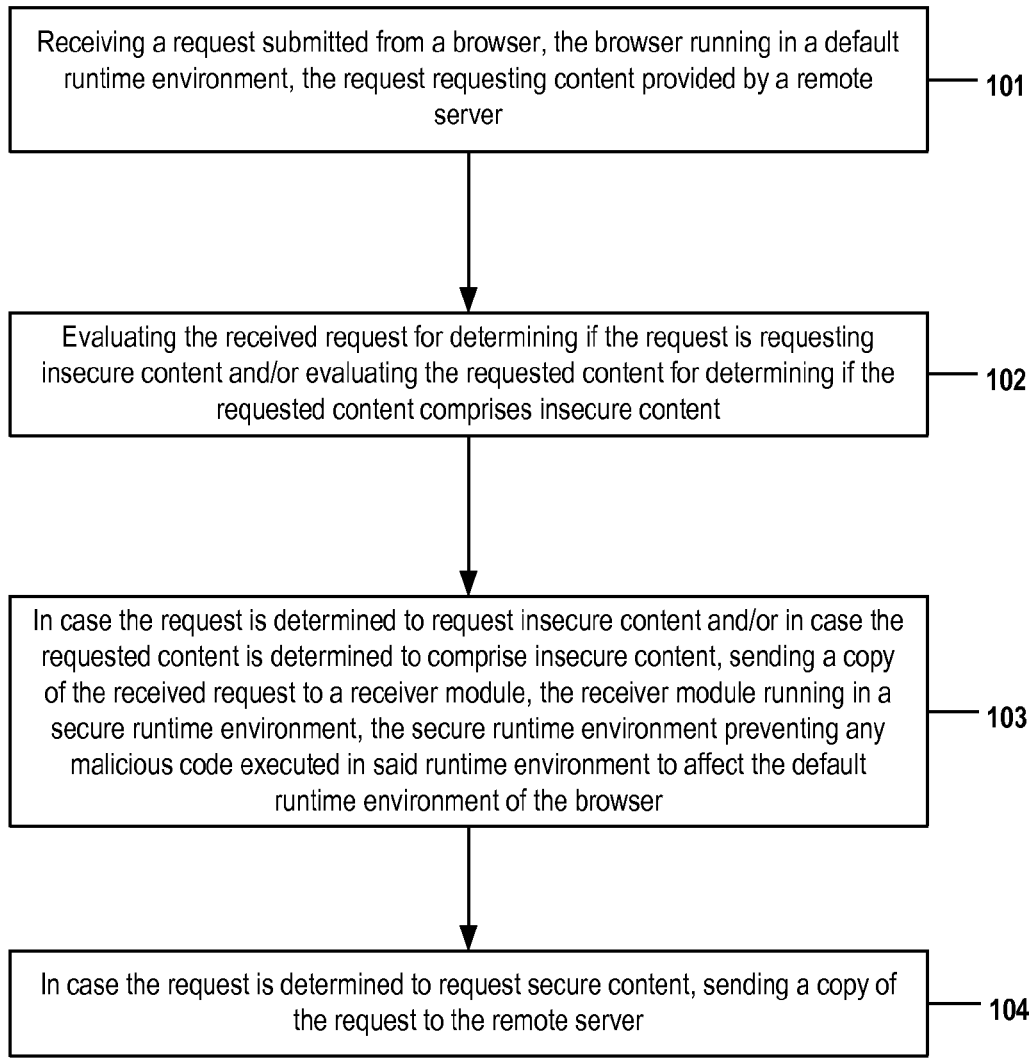
FIG. 1 is a flowchart depicting steps executed by a proxy module.

FIG. 1 is a flowchart of a method executed by a proxy module. In a first receiving step 101, the proxy module receives a request, the request having been submitted from a browser running in a default runtime environment. The request may be an HTTP request for data content of a resource hosted on a remote server being connected to the machine hosting the browser via the Internet. In an evaluation step 102, the request having been received by the proxy module is evaluated by the proxy module. In addition or alternatively, data content having been received by the proxy module from the remote server in response to the request may be evaluated in order to determine if the request is requesting insecure content. 'Insecure content' may be any data which actually comprises malware or is automatically determined to potentially comprise malware. In case the request is determined to request insecure content or the requested content is determined to comprise insecure content, the proxy module sends a copy of the received request to a receiver module in a foreboding step 103. The receiver module runs in a secure runtime environment preventing any malicious code executed therein to affect the default runtime environment of the browser. In case the request is determined to request secure content, a copy of the received request is forwarded from the proxy module to the remote server in step 104.

Figure 2A:
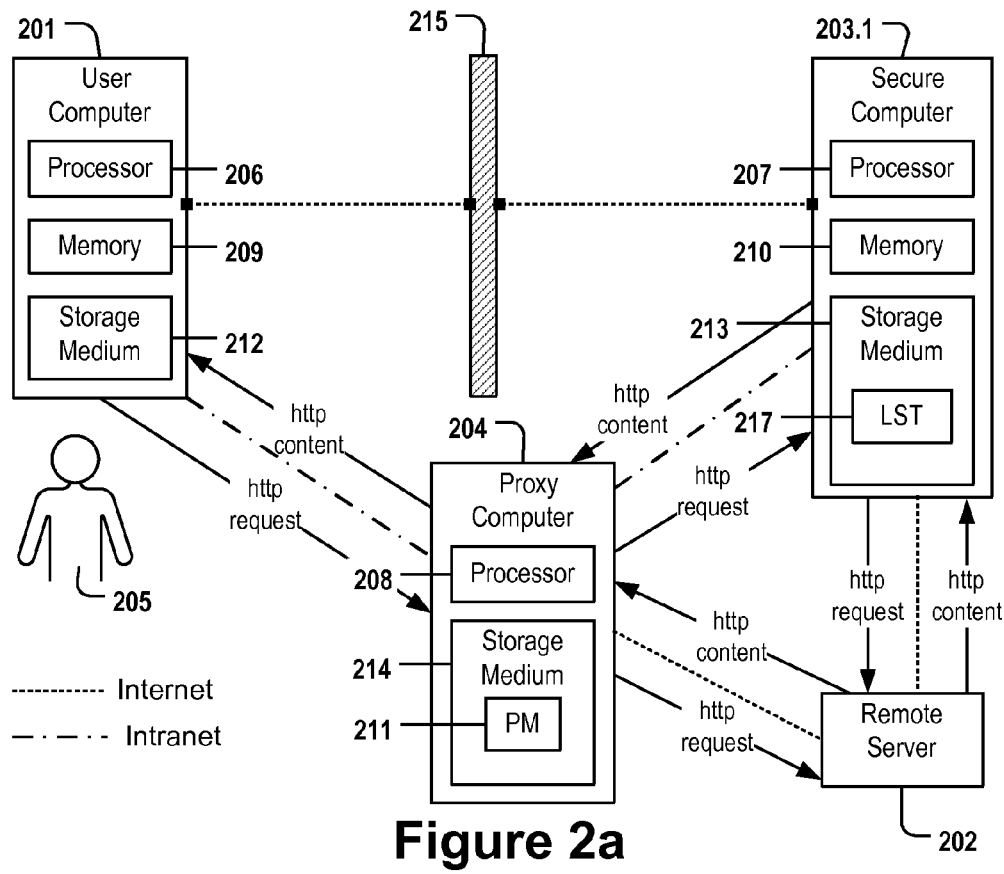
FIG. 2a is a block diagram of a receiver module running on a separate hardware platform.

FIG. 2a is a block diagram of a distributed computer system. A user computer 201 comprising a memory 209 and a storage medium 212 is connected via the Internet to a remote server 202. The storage medium 212 comprises instructions which, when executed by processor 206 provide for a default runtime environment of a browser, said browser being used by the user 205 for browsing the Internet via a proxy module 211. The proxy module is provided by a proxy computer 204 comprising a processor 208 and a storage medium 214. The browser is configured to use the proxy computer 204 for browsing the Internet. When the browser running on the user computer is configured to use the proxy module and is to receive content of a given URL, the browser creates a connection to the proxy module and sends an HTTP get request to the proxy module. The proxy computer 204 is connected via an Intranet connection to secure computer 203.1. The secure computer comprises a memory 210 and a storage medium 213 comprising instructions which when executed by the processor 207 provide for a receiver module 217. The receiver module is running in a secure runtime environment. The default runtime environment of the user computer and the secure runtime environment wherein the receiver module 217 and a secure browser are running are separated from each other by a safety measure 215, e.g. a firewall or the like. When navigating the Internet, the user may request some data content provided by the remote server. The browser of the user may send an HTTP request to the proxy module. The proxy module 211 may evaluate the request to decide if a copy of the HTTP request should be forwarded to the remote server or if a copy of the request should be forwarded to the secure computer for letting the secure computer submit the HTTP request to the remote server. In this case the requested content in a secure runtime environment. The proxy module behaves for the most part as a standard web proxy. It may be configured within the browser of the user 205 and behaves like a proxy server in the view of the Internet browser.

Each time the browser requests content of a remote server by passing a URL encapsulated in an HTTP proxy request to the proxy module, the proxy module evaluates aspects of said HTTP request (properties of the URL, GET parameters, the type of the resource providing the requested content) and/or evaluates aspects of the incoming HTTP response (the HTTP response header, the mime type of the content of the response, the actual resource content, etc.). In dependence on the evaluation of the HTTP request, the proxy module decides if a copy of the http request should be forwarded to the remote server and if the requested data should be received by the proxy module directly from there for rendering the received content by the browser of the user computer or if a copy of the HTTP request comprising the URL should be forwarded to a receiver module 217 running in a secure runtime environment (see FIG. 3). In addition or alternatively, any requested content or parts thereof received by the proxy module may be evaluated in order to determine if the received content is a security risk. In this case, the content is not forwarded to the browser of the user computer. Rather, the process of receiving this insecure content by the proxy module is stopped and the copy of the corresponding HTTP request is forwarded to the receiver module to have the receiver module request and render the insecure content in the secure runtime environment. The evaluation of the received content may comprise continuously parsing continuously received HTTP response data and stopping the receipt of said data immediately in case the data was determined to be insecure. As the evaluation and forwarding of HTTP request and response is executed by the proxy module interoperating with the receiver module, this process is completely transparent to the user 205. Any standard browser configurable to use a proxy can be employed for secure web browsing according.

Alternatively (not shown), the proxy module may run on the same computer as the browser of the user and is therefore addressable with a local IP (Internet protocol) address. The proxy module may run on the localhost address and may listen on any port for connection requests submitted by the browser.

The receiver module 217 running in the secure runtime environment may be a small software server or web server listening to an address known to the proxy module for forwarding copies of HTTP requests and providing rendered data content as a service of the software server or web server. Multiple receiver modules may run in the secure runtime environment, each of said receiver modules being characterized by different security characteristics. It is also possible that each of the multiple receiver modules runs in a secure runtime environment of its own, each of said secure runtime environments having particular security characteristics and constraints. The rules employed by the proxy module for evaluating the requests and the requested content may determine—based on the security risk determined—to which one of the plurality of receiver modules a copy of the request should be forwarded.

The receiver module listens for requests of the proxy module to open a connection. When the proxy module decides to forward a copy of a request comprising said request's URL to the receiver module, the proxy module opens a connection to the receiver module and sends the request comprising the URL (or something similar to an HTTP proxy request) to the receiver module. The receiver module receiving the URL or the HTTP proxy request then starts a secure browser with the received URL or takes some other action. The receiver module may itself behave like a web server in respect to the proxy module for sending the securely rendered content back to the proxy module. In this case, the receiver module sends a HTTP response back, thereby indicating that the requested resource has been opened within the secure runtime environment. The requested content will appear on the user's browser together with said indication.

The machine 203.1 on which the receiver module is installed may be cleared (e.g. reinstalled from scratch) on a regular basis to automatically delete malware having possibly infected the secure runtime environment.

Figure 2B:
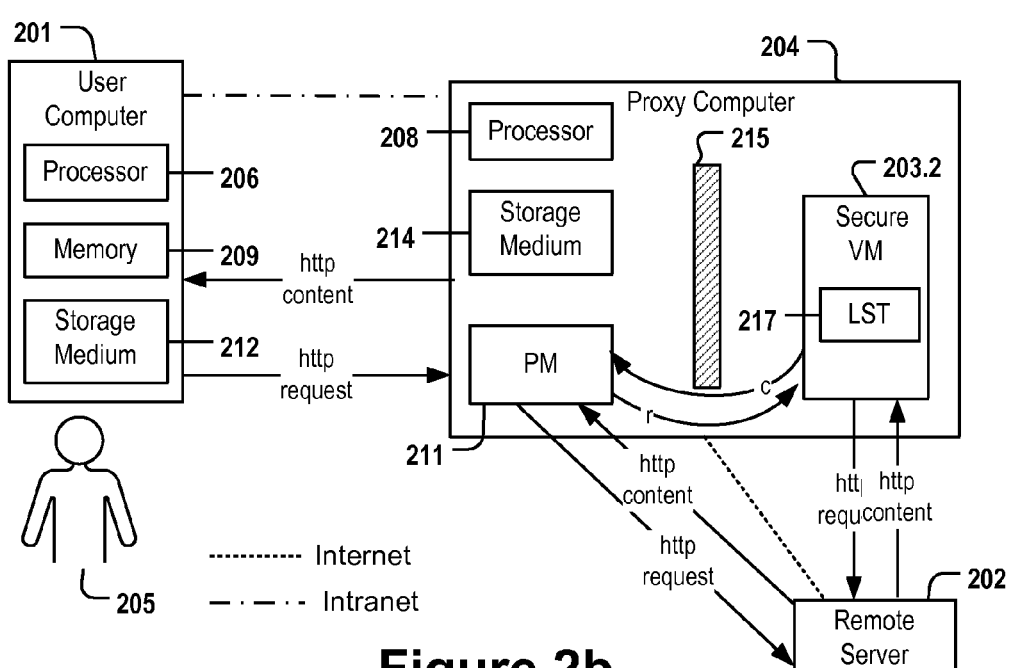
FIG. 2b is a block diagram of a receiver module running on a proxy processing device.

FIG. 2b shows another computer system wherein the proxy module and the receiver module are both running on the proxy computer 204. A secure virtual machine 203.2 may actually provide the secure runtime environment. The security constraints enforced by the virtual machine (which may preferentially be executed under a user account with limited permissions) are indicated by the safety measure 215 being an element of the proxy computer 204. The proxy module 211 runs outside the secure runtime environment provided by the virtual machine 203.2.

Alternatively (not shown), the secure runtime environment may be a process running on the same computer system as the browser of the user system and running with a lesser security privilege than the browser. In this case, any URL rendered in the secure runtime environment is rendered by a program with no greater privilege than the secure runtime environment itself.

Figure 3:
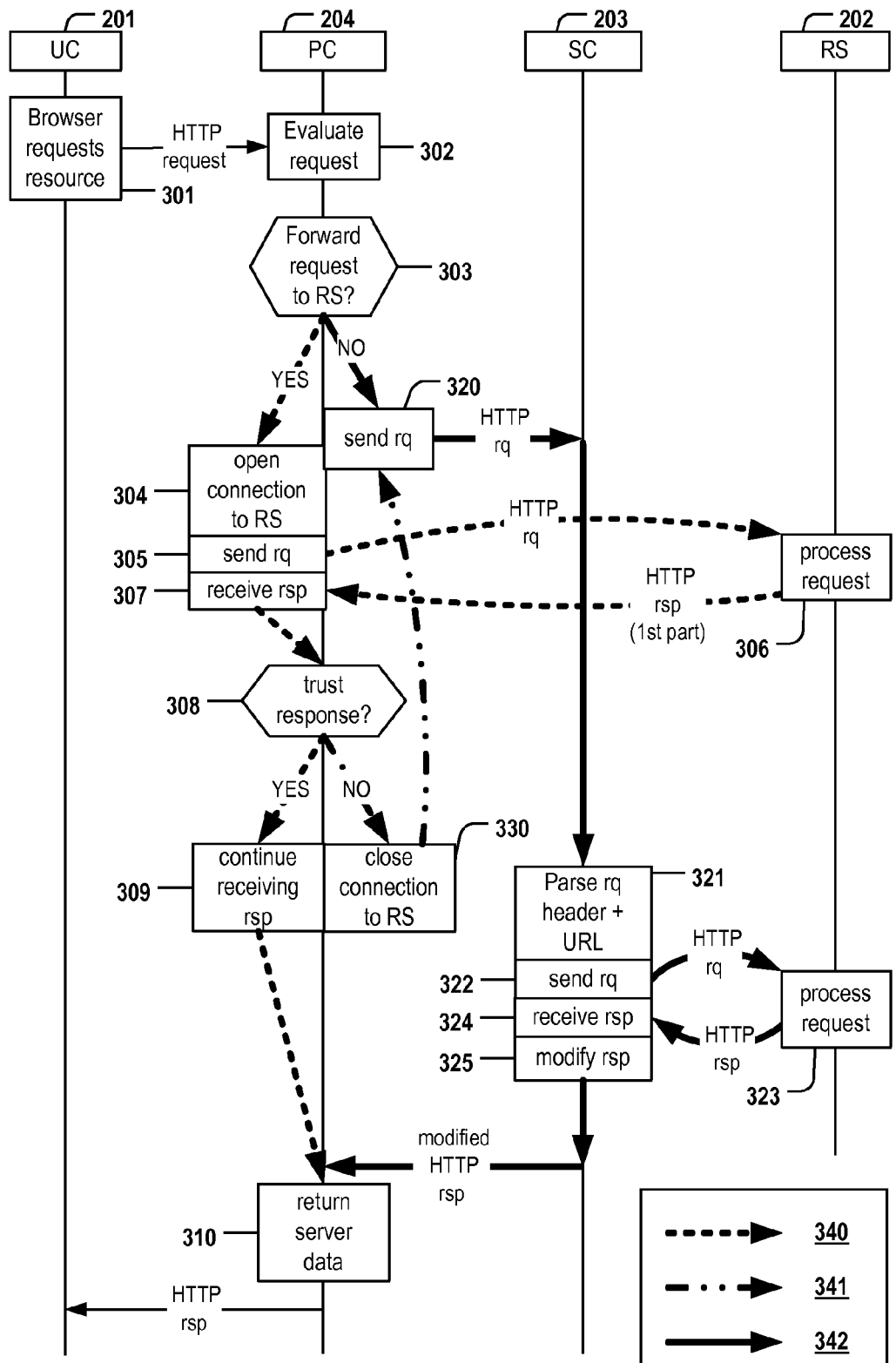
FIG. 3 shows a sequence of three possible pathways for requesting and receiving data content.

FIG. 3 is a diagram showing the data exchange between a user computer 201, a proxy module running on the proxy computer 204, a receiver module running in a secure runtime environment provided by a secure computer 203 and a remote server 202. A user may open a browser running on the user computer for requesting in step 301 data from a resource running on the remote server. The browser submits an HTTP request to the proxy module which evaluates the received HTTP request in step 302 for determining if a copy of the request should be forwarded to the remote server or not. In case it is determined in step 303 that the request is to be considered as secure, the proxy module opens an Internet connection to the remote server in step 304 and sends a copy of the secure HTTP request in step 305 to the remote server. The remote server processes the request in step 306 and returns an HTTP response or at least a part thereof to the proxy module. The proxy module receives the HTTP response in step 307 and parses and evaluates the response in order to determine in step 308 if the received content of the response can be trusted (does not comprise insecure data). In case the received content is determines to be secure, the proxy module continues in step 309 to receive response data and returns in step 310 the received data to the browser having requested the resource. The pathway of executed processing steps described above is indicated in FIG. 3 by dotted arrow symbols 340.

In case in the evaluation step 303 it is determined that the HTTP request does not request secure data and should therefore not be sent to the remote server directly, the proxy module sends in step 320 the HTTP request to the receiver module running on the secure computer 203. In step 321 the receiver module parses the received HTTP request, extracts a URL and some parameters of the header of the received HTTP request in order to prepare a new HTTP request. The new HTTP request is sent in step 322 to the remote server. The remote server processes the received request in step 323 and sends an HTTP response comprising the processing results to the receiver module. The receiver module receives the response in step 324 and may modify the received response in step 325. The modification may comprise, for example, adding an indication to the response that the requested data content was rendered within a secure runtime environment. The modified response data is sent by the receiver module to the proxy module. The proxy module returns the modified response data in step 310 to the browser running in the default runtime environment of the user computer. All said steps belong to a processing pathway depicted in FIG. 3 by a series of solid black arrows 342. In case the proxy module determines in step 308 that the received response data cannot be trusted as it comprises insecure data, the pathway indicated by another type of dotted arrows 341 is executed: the connection to the remote server is closed in step 330 by the proxy module. The HTTP request having been sent in step 305 to the remote server is sent a second time in step 320, but not to the remote server but rather to the receiver module. Then, the remaining steps of pathway 342 are executed.

The invention claimed is:

1. A computer-implemented method for secure web browsing, the method comprising:

receiving, by a proxy module, a request submitted from a browser, the browser running in a default runtime environment, the request requesting content provided by a remote server;

determining, by the proxy module, whether at least one of the following is true: the received request requests insecure content, or the requested content comprises insecure content;

in case the request is determined to request insecure content and/or in case the requested content is determined to comprise insecure content, sending, by the proxy module, a copy of the received request to a receiver module, the receiver module running in a secure runtime environment separate from the default runtime environment, the secure runtime environment preventing any malicious code executed in said runtime environment to affect the default runtime environment of the browser;

responsive to sending, by the proxy module, a copy of the received request to the receiver module, receiving, from the receiver module, at least one of: a secure displayable version of a rendered form of the requested content, or a description enabling access to the secure displayable version of the rendered form of the requested content, the rendered form of the requested content comprising a form produced in the secure runtime environment by a process of interpreting the requested content in a way that a graphical representation of the requested content can be displayed via a graphical user interface to a user, the secure displayable version of the rendered form of the requested content comprising a secure displayable graphical representation of at least some insecure requested content; and forwarding, by the proxy module, at least one of the secure displayable version of the rendered form of the requested content or the description enabling access to the secure displayable version of the rendered form of the requested content received from the receiver module, to the browser.

2. The computer-implemented method according to claim 1, the method further comprising:
in case the requested content is determined not to comprise insecure content, forwarding the requested content to the browser.

3. The computer-implemented method according to claim 1, further comprising:
listening, in the receiver module, for the receipt of the copy of the request from the proxy module.

4. The computer-implemented method according to claim 1,
wherein the proxy module is running on a proxy processing device and the browser is running on a user computer, or
wherein the proxy module and the browser are running on the user computer.

5. The computer-implemented method according to claim 1,
wherein the secure runtime environment is a runtime environment provided by a secure computer; or
wherein the secure runtime environment is a virtual machine running on the proxy processing device, wherein the browser is running on the user computer, the virtual machine preventing any malicious code executed in said virtual machine to affect a runtime environment of the proxy module; or
wherein the secure runtime environment is a virtual machine running on the user computer, wherein the browser is also running on the user computer and wherein any malicious code executed in said virtual machine is prohibited from affecting the default runtime environment of the browser by running the virtual machine with less privileges than the default runtime environment.

6. The computer-implemented method according to claim 1 further comprising:
providing the proxy module as an integral part of a protocol stack of the user computer, the protocol stack being responsible for establishing a network connection between the proxy module and the browser of the user computer and/or for establishing a network connection between the proxy module and the remote server.

7. The computer-implemented method according to claim 1, wherein evaluating the received request comprises one or more steps being selected, in any combination, from a group comprising:
extracting a URL from the request and evaluating the URL; and
evaluating the type of the requested content and/or the type of resource providing the content.

8. The computer-implemented method according to claim 1, further comprising:
receiving at least a header of the response from the remote server, the response being a response to the copy of request sent to the remote server;
evaluating the header for determining if the response comprises insecure content;
in case the response is determined to comprise insecure content, sending the copy of the request to the receiver module for enabling the receiver module to send the request to the remote server;
in case the response is determined to comprise secure content, continuing receiving the response until the complete response is received; and
sending the complete response or the data contained therein to the proxy module.

9. A computer-implemented method for secure web browsing, the method being executed in a secure runtime environment, the method comprising:
receiving, by a receiver module running in the secure runtime environment, a request from a proxy module, the request originating in a browser running outside the secure runtime environment, the request requesting content provided by a remote server;
sending a copy of the received request to the remote server;
receiving a response in response to the sending of the copy of the request, the response containing at least one insecure object;
rendering content of the received response within the secure runtime environment to generate a secure displayable version of the rendered content which does not contain the at least one insecure object, the rendered content of the received response comprising a form produced in the secure runtime environment by a process of interpreting the content of the received response in a way that a graphical representation of the content of the received response can be displayed via a graphical user interface to a user, the secure displayable version of the rendered content comprising a secure displayable graphical representation of at least some insecure content of the received response;
returning, by the receiver module, the secure displayable version of the rendered content and/or a description thereof enabling access to the secure displayable version of the rendered content to the proxy module.

10. The computer-implemented method of claim 9, wherein the step of sending the copy of the received request to the remote server further comprises:
extracting, by the receiver module, an URL from the received request, the URL pointing to a resource of the remote server, the resource providing the requested content;
starting or using, by the receiver module, a secure browser for sending the copy of the received request by the secure browser, the secure browser running in the secure runtime environment, the copy of the received request being submitted by the secure browser to the extracted URL, the secure browser being a standard browser or a custom browser.

11. The computer-implemented method of claim 9, wherein the steps of rendering content of the received response within the secure runtime environment to generate a secure displayable version of the rendered content which does not contain the at least one insecure object and the step of returning the secure displayable version of the rendered content and/or the description thereof enabling access to the secure displayable version of the rendered content to the proxy module are executed according to an implementation variant being selected from a group of implementation variants comprising:
rendering the content of the received response by a secure browser running in the secure runtime environment in response to the sending of the copy of the received request by the secure browser; sending at least the description thereof enabling access to the secure displayable version of the rendered content from the receiver module to the proxy module the description comprising a specification of a secure computer system hosting the secure runtime environment and/or a specification of one out of a plurality of screens of said secure computer system, said one screen displaying the rendered content;

extracting, by the receiver module, an URL from the received request, the URL pointing to a resource of the remote server, the resource providing the requested content; creating, by the receiver module, a html page comprising the URL as a value of a src attribute; storing the html page in a storage medium within the secure runtime environment; triggering, by the receiver module, the secure browser to open, render and display the stored html page including the source provided via the URL; and sending at least the description thereof enabling access to the secure displayable version of the rendered content from the receiver module to the proxy module, the description comprising a specification of the secure computer system and/or a specification of the one screen displaying the rendered content;

rendering the content of the received response by the receiver module; storing the rendered content in a storage medium within the secure runtime environment in a secure data format, the secure data format being a data format guaranteeing not to comprise executable instructions; sending at least the description of the rendered content from the receiver module to the proxy module, the description comprising a content-address, the content-address allowing a browser outside the secure runtime environment to access and open said stored and rendered content.

12. The computer-implemented method of claim 9, wherein the receiver module is a web server, the method further comprising:

sending the rendered content and/or a description thereof and/or an indication of the rendering in the secure runtime environment to the proxy module by sending a html document to the proxy module, the sent html document comprising an address to rendered content stored to the storage medium within the secure runtime environment or comprising an indication of a display device coupled to the secure runtime environment where the rendered content is displayed.

13. A non-transitory computer-readable storage medium comprising computer-interpretable instructions which when executed by a processor cause the processor to execute a method according to claim 9.

14. A proxy processing device for secure web browsing, the proxy processing device comprising:

an interface being adapted for receiving a request submitted from a browser, the browser running in a default runtime environment, the request requesting a content provided by a remote server;

a processor;

a proxy module comprising instructions stored in a non-transitory computer-readable storage medium, wherein the proxy module:

determines whether at least one of the following is true: the received request requests insecure content, or the requested content comprises insecure content;

in case the request is determined to request insecure content and/or in case the requested content is determined to comprise insecure content, sends a copy of the received request to a receiver module, the receiver module running in a secure runtime environment separate from the default runtime environment, the secure runtime environment preventing any malicious code executed in said runtime environment to affect the default runtime environment of the browser;

responsive to sending a copy of the received request to the receiver module, receives, from the receiver module, at least one of: a secure displayable version of the requested content in a rendered form, or a description enabling access to the secure displayable version of the requested content in rendered form, the rendered form of the requested content comprising a form produced in the secure runtime environment by a process of interpreting the requested content in a way that a graphical representation of the requested content can be displayed via a graphical user interface to a user, the secure displayable version of the requested content in rendered form comprising a secure displayable graphical representation of at least some insecure requested content; and forwards at least one of the secure displayable version of the requested content in a rendered form or a description enabling access to the secure displayable version of the requested content in rendered form received from the receiver module to the browser.

15. A secure computer system comprising:

a processor;

a secure runtime environment;

a first interface being adapted for receiving a request submitted from a proxy module, the request originating in a browser running outside the secure runtime environment, the request requesting content provided by a remote server;

a receiver module comprising instructions stored in a non-transitory computer-readable storage medium, the receiver module running in the secure runtime environment;

a second interface being adapted for:

sending a copy of the received request to the remote server;

receiving a response in response to the sending of the copy of the received request, the response containing at least one insecure object;

wherein the receiver module renders content of the received response within the secure runtime environment to generate a secure displayable version of the rendered content which does not contain the at least one insecure object, the rendered form of the content of the received response comprising a form produced in the secure runtime environment by a process of interpreting the content of the received response in a way that a graphical representation of the content of the received response can be displayed via a graphical user interface to a user, the secure displayable version of the rendered content comprising a secure displayable graphical representation of at least some content of the at least one insecure object;

wherein the receiver module further returns the secure displayable version of the rendered content and/or a description thereof enabling access to the secure displayable version of the rendered content to the proxy module.

* * * * *